UNITED STATES PATENT OFFICE.

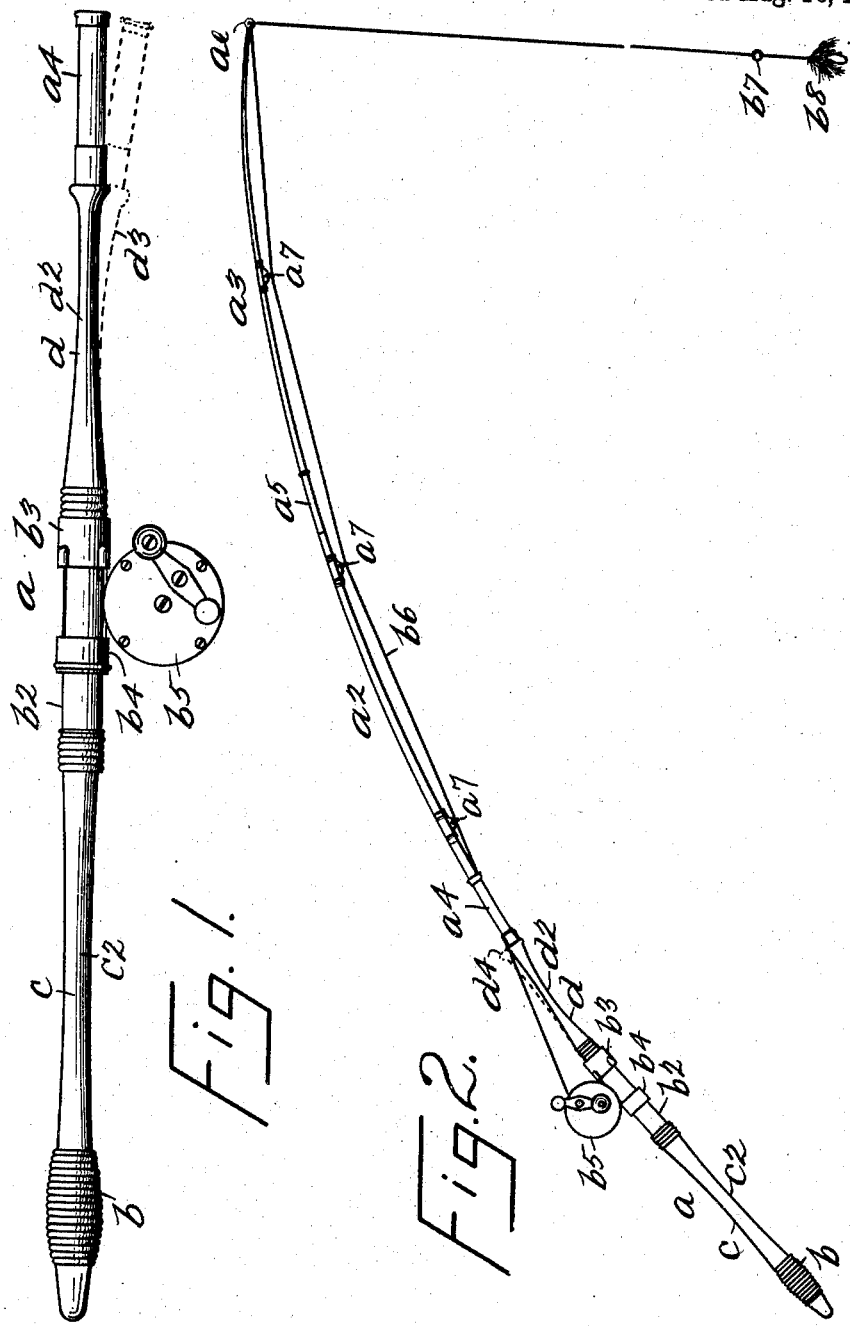

THOMAS F. JUDGE, OF NEW YORK, N. Y.

FISHING-ROD.

967,642.  Specification of Letters Patent.  Patented Aug. 16, 1910.

Application filed April 12, 1910. Serial No. 554,975.

*To all whom it may concern:*

Be it known that I, THOMAS F. JUDGE, a citizen of the United States of America, and residing at New York, in the county of New York and State of New York, have invented certain new and useful Improvements in Fishing-Rods, of which the following is a specification, such as will enable those skilled in the art to which it appertains to make and use the same.

This invention relates to fishing rods, particularly to that class designed for casting, and the object thereof is to provide novel means whereby a longer cast may be made than with such rods as heretofore constructed.

A further object is to accomplish this result and at the same time lighten the butt of the rod; and a still further object is to provide such rods which are simple in construction and use, which are well adapted to the purposes for which they are intended, and which are comparatively inexpensive.

My invention is fully described in the following specification, of which the accompanying drawings form a part, in which the separate parts are designated by the same reference characters in each of the views, and in which:—

Figure 1 is a view of the butt of a fishing rod, constructed according to my invention; and Fig. 2 is a view of a fishing rod so constructed at the moment of making a cast.

In the drawings forming a part of this application I have shown a fishing rod comprising the usual sections or joints $a$, $a^2$, and $a^3$, any number of which may be provided, said joints being connected by means of the usual ferrules $a^4$ and $a^5$ and the tip thereof being provided with the usual ring lead $a^6$, a plurality of leads $a^7$ being also provided at suitable points.

The joint $a$, or as it is generally termed, the butt, is provided with a grip $b$ and with a sleeve $b^2$ serving also as a grip, said sleeve being provided with an enlarged portion $b^3$ and with a ring $b^4$ which together serve to secure the reel $b^5$ in position, said reel having the line $b^6$ wound thereon whence it passes through the leads $a^6$ and $a^7$ and is provided with the sinker $b^7$ and fly $b^8$ or other suitable and desirable forms of tackle.

As shown in the drawings, the section $c$ between the grips $b$ and $b^2$ is reduced in diameter at a point $c^2$ approximately in the center thereof, this being for an object hereinafter explained, and serving also to lighten the butt $a$, but this is not an essential part of my invention as the same diameter may prevail throughout the portion $c$ if desired.

My invention consists primarily in reducing the diameter of the part $d$, between the grip $b^2$ and the ferrule $a^4$, as shown at $d^2$, in the manner described with reference to the part $c$, this reduction being greater, preferably than that of the part $c$, and being designed to permit an added or increased elasticity, or spring, to the part $d$ as indicated in dotted lines at $d^3$ and $d^4$, the former being the sprung and the latter the normal positions of the said part of the rod.

In practice, as will be readily understood, the rod is gripped by the hands at $b$ and $b^2$ and drawn backwardly for the cast, a portion of the line $b^6$ extending beyond the tip $a^5$, after which the grip $b$ is drawn back sharply and the grip $b^2$ forced forwardly quickly and forcibly, thus tending to curve the outer joints in the ratio of their diameters and material, and also curving the part $d$ as indicated, the degree of curvature shown being excessive for the sake of clearness in description and, when the cast is made, this curvature assists therein by the rapid recovery to the normal position of the part $d$ and a longer cast is thereby the result.

In rods with rigid butts the only spring is in the slender, tapering, parts thereof, and increasing naturally toward the tip and, therefore, the arc described by the said tip in making the cast is relatively small and of small radius and the recovery is slow for the reason that the spring and recovery extends over a great length of the rod and is, therefore, progressive from the thicker to more slender diameters, or in other words, from the longer to the shorter radii of the arc of the curve described by the tip. With my improvement, however, a new center is formed at the part $d$ of which the radius is very long and a greater arc of tip movement results in the beginning of a cast and a recovery of a rapidity in the ratio of the diameter and material of the part $c$ and a much longer cast is possible than with ordinary rods, and this added spring is well beyond the outer grip $b^2$, but within the practically rigid portion of the joint next the butt.

As previously stated, the reduction in diameter of the part $c$ may be provided if desired, for the purpose of lightening the rod, and of permitting also a slight spring to assist in the cast, although I believe the recovery from a sprung position of this part is too slow to be of material advantage in making a cast for the reason that it occurs between the hands of the caster, generally firmly gripped.

It will be evident that I do not limit myself to any specific diameters or lengths of the reduced part $d^2$, nor to any specific woods or other material but, Having fully described my invention, what I do claim as new and desire to secure by Letters Patent, is:—

1. A fishing rod having two grips for the hands of a user, one adjacent the inner end thereof and the other intermediate of the ends, and being provided with a reduced portion adjacent to the latter grip but between the same and the outer rod end, to supplement the normal rod spring.

2. A fishing rod having two grips for the hands of a user, one adjacent the inner end thereof and the other intermediate of the ends, and having a reel seat at said latter grip, and being provided with a reduced portion between said reel seat and the outer rod end, adjacent said seat, to supplement the normal rod spring.

3. In a fishing rod, a butt provided with a hand grip at the inner end and a hand grip intermediate the ends, and being provided with a reduced portion adjacent the latter grip, between the same and the outer butt end to supplement the normal spring.

4. In a fishing rod, a butt provided with a hand grip at the inner end and a supplemental grip intermediate the ends, and having a reel seat at the latter grip, and being provided with a reduced portion adjacent said reel seat, between the same and the outer butt end, to supplement the normal rod spring.

5. In a fishing rod, a butt provided with a hand grip at the inner end and a supplemental grip intermediate the ends, and being reduced in diameter, abnormally, adjacent to and on each side of said intermediate grip to supplement the normal rod spring.

6. In a fishing rod, a butt provided with a hand grip at the inner end and a supplemental grip intermediate the ends, and being reduced in diameter, abnormally, adjacent to and on each side of said supplemental grip to supplement the normal rod spring, and means at said supplemental grip for holding a reel.

In testimony that I claim the foregoing as my invention I have signed my name in presence of the subscribing witnesses this 7th day of April 1910.

THOMAS F. JUDGE.

Witnesses:
  GEORGE F. BENTLEY,
  J. C. LARSEN.